United States Patent
Oh

(12) 
(10) Patent No.: US 8,918,640 B2
(45) Date of Patent: Dec. 23, 2014

(54) APPARATUS AND METHOD FOR USING SECURE REMOVABLE MEDIA (SRM) IN DIGITAL RIGHTS MANAGEMENT

(75) Inventor: Yun-Sang Oh, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 733 days.

(21) Appl. No.: 12/583,307

(22) Filed: Aug. 18, 2009

(65) Prior Publication Data

US 2010/0049971 A1 Feb. 25, 2010

(30) Foreign Application Priority Data

Aug. 21, 2008 (KR) .................. 10-2008-0082100

(51) Int. Cl.
*H04L 29/06* (2006.01)
*H04L 9/32* (2006.01)

(52) U.S. Cl.
CPC .............. *H04L 9/3247* (2013.01); *H04L 9/321* (2013.01); *H04L 2209/603* (2013.01); *H04L 9/3268* (2013.01)
USPC ........................................... 713/158; 726/26

(58) Field of Classification Search
USPC ................ 713/155–158; 380/279; 726/26–33
See application file for complete search history.

(56) References Cited

U.S. PATENT DOCUMENTS

| 7,734,917 B2* | 6/2010 | Chang et al. .................. 713/167 |
| 2002/0186844 A1* | 12/2002 | Levy et al. ..................... 380/231 |
| 2005/0138357 A1* | 6/2005 | Swenson et al. .............. 713/155 |
| 2005/0210241 A1* | 9/2005 | Lee et al. ....................... 713/158 |
| 2006/0156416 A1* | 7/2006 | Huotari et al. .................. 726/27 |
| 2007/0157318 A1* | 7/2007 | Lee et al. ......................... 726/27 |
| 2007/0266440 A1* | 11/2007 | Kim et al. ......................... 726/26 |
| 2008/0155614 A1* | 6/2008 | Cooper et al. .................. 725/91 |
| 2009/0164776 A1* | 6/2009 | Tuoriniemi .................... 713/158 |
| 2009/0180621 A1* | 7/2009 | Kratz et al. ..................... 380/278 |
| 2009/0210704 A1* | 8/2009 | Han et al. ....................... 713/158 |

OTHER PUBLICATIONS

Jean De Clercq Windows Server 2003 Security Infrastructures Google Books, 2004.*

* cited by examiner

*Primary Examiner* — Kambiz Zand
*Assistant Examiner* — Ghodrat Jamshidi

(57) ABSTRACT

An apparatus and a method for using a Secure Removable Media (SRM) in Digital Rights Management (DRM) are provided. The method for using the SRM in Digital Rights Management (DRM) includes determining, at a plurality of content service providers, an SRM usage rule and providing the determination to a trust authority using an eXtensible Markup Language (XML); receiving messages comprising the SRM usage rule from the content service providers and sending the messages to an apparatus together with an electronic signature; and receiving the messages comprising the SRM usage rule and changing an operation of the apparatus according to requirements of at least one content service provider. Thus, various content business models can be realized.

27 Claims, 5 Drawing Sheets

APPARATUS AND METHOD FOR USING SECURE REMOVABLE MEDIA (SRM) IN DIGITAL RIGHTS MANAGEMENT

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Aug. 21, 2008 and assigned Serial No. 10-2008-0082100, the entire disclosure of which is hereby incorporated by reference.

TECHNICAL FIELD OF THE INVENTION

The present invention relates generally to Digital Rights Management (DRM). More particularly, the present invention relates to an apparatus and a method for using Secure Removable Media (SRM) in DRM.

BACKGROUND OF THE INVENTION

Digital Rights Management (DRM) technology prevents unauthorized distribution and copying of digital contents, allows only legitimate users to use the content, and manages the digital content copyright using a charging service.

Open Mobile Alliance (OMA) DRM, which is widely used as the de facto standard of the DRM technology, is standardized by an OMA standard body. The OMA DRM standard specifications provide that contents are encrypted, a key used for the encryption is packaged in the form of a Rights Object (RO), and the key is safely transmitted to a device such as mobile phone. After the start of the OMA DRM version 1.0 in 2002, the OMA DRM version 2.0 was released in 2006, and the OMA DRM version 2.1 was released in 2007. Secure Removable Media (SRM) standard version 1.0, which extends the DRM technology not only to the mobile phones but also to external memories such as memory card and smart card, was released in 2008. The SRM 1.0 standard is the extension of the OMA DRM 2.0 and has functions including Device to SRM Move which transfers the RO from the device to the memory card or the smart card, SRM to Device Move which transfers the RO from the memory card or the smart card to the device, and Local Rights Consumption which plays contents using the RO stored to the memory card or the smart card at the device.

Starting from the OMA DRM 2.0, the content encryption key is managed according to a Public Key Infrastructure (PKI) scheme. The PKI scheme, which makes use of powerful asymmetric key encryption such as an RSA encryption algorithm, is treated as the notably safe key management system. Disadvantageously, the PKI demands a system in which a powerful trust authority, such as the government, issues and manages the key.

The OMA DRM 2.0 functions to protect a protocol message carrying the RO from a service provider or the content provider to the device, to protect the content encryption key, to package the RO, to encrypt and package the contents, and to support a sharing technique of the RO between devices.

FIG. 1 depicts relations between a trust authority, a content provider or a service provider, and a device in the DRM system.

Referring to FIG. 1, the trust authority 100, which is called a Certification Authority (CA), issues the key to the service provider 110 or the device 120, and distributes the key to key users. When the user holding the key is compromised and the authorized use of the key is impossible, the trust authority 100 manages the key management system by revoking the key.

The problem with the PKI system adopting the OMA DRM 2.0 is that the OMA does not manage the trust authority. The OMA merely develops the technical standards. Accordingly, it is necessary to manage the key used in the OMA DRM by a trust authority of international reliability. In response to this, Content Management License Administrator (CMLA) was formed by Samsung Electronics, Nokia, Intel, and Panasonic in 2004, which is the PKI trust authority for the OMA DRM 2.0.

The CMLA operates a server which distributes and manages the PKI keys to the multimedia service provider, the content provider, and the device provider, who adopt the OMA DRM 2.0 technology. The system implementing the OMA DRM 2.0 standard can offer complete multimedia content services by receiving and installing the key of the CMLA.

External memories or smart cards do not have their own independent power source or network connection because of their mechanical feature, and always depend on the function of the device. In addition, external memories or smart cards, which can be easily attached and detached to and from the device, are highly likely to suffer from physical communication disconnection during communication.

Based on the characteristics of the SRM as discussed above, the SRM standard entrusts the trust authority with the determination of some of the functions. However, neither the OMA nor the trust authority considers technical details.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and a method for changing an operation setting according to a Secure Removable Media (SRM) usage rule by taking into account various requirements of a content service provider.

Another aspect of the present invention is to provide an apparatus and a method for flexibly changing an operation setting of an apparatus connected to an SRM in accordance with requirements of a content service provider.

According to one aspect of the present invention, an apparatus for using an SRM in Digital Rights Management (DRM) includes a receiving module for receiving a message comprising an SRM usage rule from a trust authority; an SRM usage rule manager for verifying an electronic signature of the message comprising the SRM usage rule; and a processor for analyzing and processing the verified SRM usage rule.

According to another aspect of the present invention, a method for using SRM in DRM includes receiving a message comprising an SRM usage rule from a trust authority; verifying an electronic signature of the message comprising the SRM usage rule; and analyzing and processing the verified SRM usage rule.

According to yet another aspect of the present invention, a method for using an SRM in DRM includes determining, at a plurality of content service providers, an SRM usage rule and providing the determination to a trust authority using an eXtensible Markup Language (XML); receiving messages comprising the SRM usage rule from the content service providers and sending the messages to an apparatus together with an electronic signature; and receiving the messages comprising the SRM usage rule and changing an operation of the apparatus according to requirements of at least one content service provider.

According to still another aspect of the present invention, a system for using an SRM in DRM includes content service providers for determining an SRM usage rule and providing the determination to a trust authority using an XML; the trust authority for receiving messages comprising the SRM usage rule from the content service providers and sending the messages to an apparatus together with an electronic signature; and the apparatus for receiving the messages comprising the SRM usage rule and changing an operation of the apparatus according to requirements of at least one content service provider.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
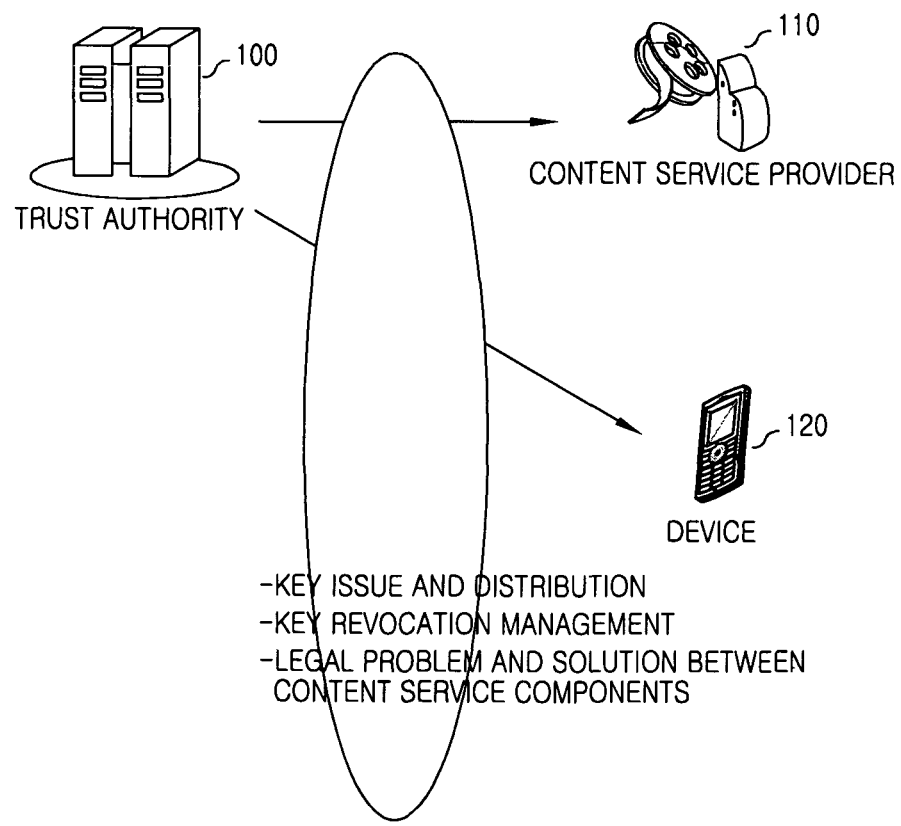
FIG. 1 illustrates a diagram of relations between a trust authority, a content provider or a service provider, and a device in a DRM system.

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Exemplary embodiments of the present invention provide an apparatus and a method for using a Secure Removable Media (SRM) in Digital Rights Management (DRM). Hereinafter, the apparatus represents a portable terminal, a computer, a Personal Digital Assistants (PDA), a MP3 player, a Portable Multimedia Player (PMP), a PlayStation Portable (PSP), and so forth, which includes an external memory attached and can play contents with Rights Objects (ROs), for example, the rights of using music files and video files.

Open Mobile Alliance (OMA) released the SRM standard in 2008. Similar to the DRM 2.0, the SRM also adopts a Public Key Infrastructure (PKI) key management scheme. In the case of OMA DRM 2.0, a trust authority has no technical matters to determine other than the distribution and the management of the keys. To the contrary, according to the release of the SRM 1.0 standard, the technical matters demand the determination of the trust authority (which is named as a trust model in the OMA SRM standard).

The SRM extends the OMA DRM 2.0 optimized for the portable terminal to an external memory such as a memory card or a smart card. According to the OMA SRM 1.0 standard, the technical matters to be determined by the trust authority are as follows.

First, as for Rights Issuer Signature Verification, the apparatus can decode contents by reading the RO from the memory card and extracting a content encryption key. According to the SRM standard, to check the integrity of the RO stored to the memory card, the apparatus needs to verify a signature of a Rights Issuer (RI) added to the RO by the RI. In so doing, operations required for the signature verification may delay the start of the content playing and inconvenience a user. Thus, the SRM standard provides that the trust authority can determine whether to verify the signature.

Secondly, as for Revocation Status Checking using an Online Certificate Status Protocol (OCSP), when a problem occurs with regard to a certain key user in the PKI key management and the legitimate key use is infeasible, the corresponding key is disabled through a revocation procedure. Other key users do not exchange information requiring trust with the user of the revoked key. Herein, to allow the key users to determine whether the key is revoked or not, the trust authority uses two methods. The first method issues a Certification Revocation List (CRL) to every user. The CRL is a list of the revoked keys. The second method is an OCSP. When receiving a request inquiring whether a particular key is revoked while operating an OCSP server, the trust authority sends the corresponding response to the requester. The CRL does not suffer from traffic overhead in the OSCP server of the trust authority and can be used at the apparatus without the network connection. However, when the number of the revoked keys increases, the apparatuses need the space to accommodate the increasing number of revoked keys. Also, when network connection is not readily available, the apparatuses cannot obtain the latest CRL information. By contrast, using an OCSP, the apparatus does not have to store the revoked status of other keys and can always obtain the latest CRL information. However, the OCSP is unusable at an apparatus without network connection.

The SRM includes a memory card and a smart card such as subscriber Identification Module (SIM) card. Mostly, a memory card is widely used in devices not requiring network connection, such as cameras, MP3 players, and computers, for storing and moving data. The smart card (e.g., a SIM card) is attached to the portable terminal at all times, and network connection over a wireless network is feasible. Due to those two aspects of the SRM standard, the SRM standard achieves the technical flexibility by mandating the revocation status checking using the CRL and providing the method using an OCSP as an option. The SRM standard describes that the trust authority can determine whether to adopt an OCSP.

Thirdly, as for Rights Move Recovery, the SRM standard defines a message for moving the RO between the apparatus and the external memory. Unlike the copying, the original RO should be erased after the RO is moved. Hence, the duplication of the key protecting the multimedia content and the infringement of the content copyright can be avoided in the movement of the RO.

A problem in the movement of the RO is the infeasible data exchange during the disconnection between the external memory and the apparatus. For example, when sending the RO to the external memory but not receiving a response for the transfer, the apparatus cannot determine whether to keep or erase the RO. If the RO is maintained and the RO is successfully stored to the external memory, this implies an unintentional duplication. If the RO is erased and the storing of the RO to the external memory fails, the user can no longer use his/her purchased RO.

With respect to the problem in the movement of the RO and the infeasible connection to the correspondent, the SRM standard describes a method for recovering from the former problem when the connection is re-established. Yet, a message exchanged for the recovery has error and either side may not receive the message.

In this regard, the SRM standard allows the trust authority to permit copying of the RO, or to erase the original RO by strictly prohibiting the copying and offering a proper compensation to a future content user.

Fourthly, as for Rights Consumption and Release, the SRM, unlike a magneto-optic medium such as a CD or DVD, allows the contents to be stored to an embedded memory of the apparatus and the RO to be stored to the external memory. Accordingly, when the external memory is detached from the apparatus while the contents stored to the embedded memory is played using the RO stored to the external memory, it is controversial whether to permit the playing of the corresponding contents with the detached external memory connected to another apparatus. When the apparatus makes use of the RO in the external memory, the SRM standard temporarily disables the RO. The disabled RO is reversible only by the apparatus which disabled the RO. That is, even when the external memory is detached and connected to another apparatus, the disabled RO is unusable. When the content playing finishes normally, the apparatus enables the used RO, which is referred to as a release in the SRM standard. When the external memory is connected to other apparatuses, the corresponding RO is usable.

Disadvantageously, when the apparatus has an error in the normal content playing and cannot release the RO, the user can no longer utilize the corresponding RO. Thus, the SRM standard allows the trust authority to determine a time for the apparatus to release the RO.

Lastly, as for Event Counting, the shortcoming of the revocation using the CRL is that the latest CRL information is not maintained, which is quite impermissible in terms of the security. To address this shortcoming, the SRM standard describes the event counting method. According to the event counting method, by measuring the number of repetitions of the event which uses the RO for the RO movement or the content playing, the apparatus receives a new CRL when the measured number exceeds a threshold. The event counting can raise the level of the security, whereas the apparatus without the network connection cannot receive the CRL even when the number of the events reaches the threshold. As a result, the user is inconvenienced. Thus, the SRM standard lets the trust authority determine whether to use the event counting scheme.

The present invention provides 1) an SRM usage rule expression language for representing 5 matters determined by the trust authority in relation with the SRM, 2) an apparatus and a method for sending the SRM usage rule between the trust authority, the service provider or the content provider, and the apparatus, 3) an apparatus and a method for changing the operation according to the setting of the SRM usage rule, and 4) a method for reporting the result of the apparatus operation result to the trust authority according to the setting of the SRM usage rule.

The SRM usage rule, which is set when the apparatus uses a certain RO, is expressed with a format language such as eXtensible Markup Language (XML).

```
<rule>
    <RIID>rightsissuerID@samsung.com</RIID>
    <RI-signature-verification mode = on/>
    <OCSP mode = on>
        <OCSP-responder-address>
            ocsp-responder.samsung.com
        </OCSP-responder-address>
    </OCSP>
    <RO-duplication allowed=yes/>
    <RO-release timer=x/>
    <event-counting>
        <RO-move-counting mode=on threshold=x/>
        <RO-local-consumption-counting mode=on threshold=y/>
    </event-counting>
</rule>
```

The tags and the attributes are explained in Table 1.

TABLE 1

| Tag | Description |
|---|---|
| <rule> | Includes the entire SRM Usage Rule |
| <RIID> | Rights Issuer (RI) of the RO to use the setting of the corresponding rule. |
| | When the apparatus uses the RO issued by RI indicated by RIID, the apparatus has to operate according to the corresponding SRM usage rule. |
| RI-signature-verification> | When the mode attribute is "on", the apparatus should verify RI signature to use the RO. When the mode attribute is "off", the apparatus does not verify the RI signature. |
| <OCSP> | When the mode attribute is "on", the apparatus should obtain latest CRL information from the OCSP server using OCSP to use the RO. When the mode attribute is "off", the apparatus does not use |

TABLE 1-continued

| Tag | Description |
| --- | --- |
| | the OCSP function. |
| <OCSP-responder-address> | Address of the OSCP server connected when the mode attribute is on in <OCSP>. |
| <RO-duplication> | When the allowed attribute is "yes", although it is highly likely that the RO is copied due to a problem in the RO movement between the apparatus and the SRM, the recovery function is not performed but the copying is permitted. In case of "no", the recovery function is repeated to erase the copied RO. |
| <RO-release> | When the contents are played using the RO stored to the SRM, the release time of the RO stored to the SRM is expressed as a time elapse after the start of the content reproduction. For example, When timer = x, the apparatus releases the RO of the SRM in x seconds after using the RO. Without this tag, the apparatus releases the RO always after the content reproduction finishes o$$ the user aborts the reproduction. |
| <event-counting> | The apparatus determines whether to count the number of events in case of the RO movement or the event usage. |
| <RO-move-counting> | When the mode attribute is "on", the number of move events is counted. When the number reaches a value set by threshold attribute, the occurrence of the corresponding event is blocked. |
| <RO-local-consumption-counting> | When the allowed attribute is "on", the number of the events using the RO is counted. When the number reaches a value set by the threshold attribute, the occurrence of the corresponding event is blocked |

The SRM usage rule can be expressed with any formal language as well as the XML.

Figure 2:
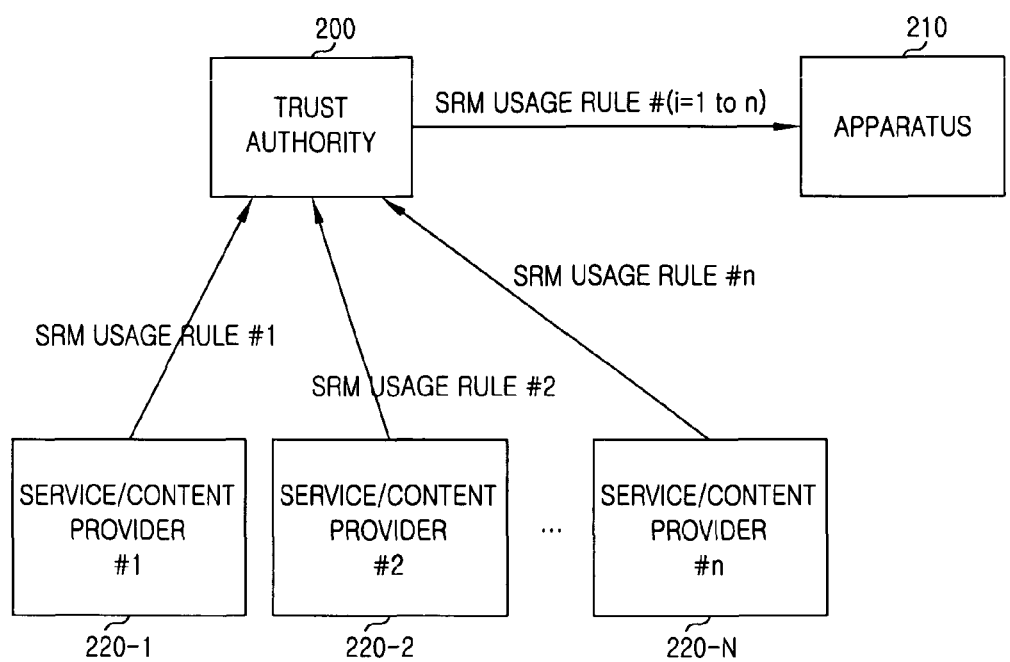
FIG. 2 illustrates a diagram of an SRM usage rule message of FIG. 1 transferred between a trust authority, a service provider or a content provider, and an apparatus according to an exemplary embodiment of the present invention.

FIG. 2 depicts the SRM usage rule message of FIG. 1 transferred between the trust authority, the service provider or the content provider, and the apparatus according to an exemplary embodiment of the present invention.

Figure 3:
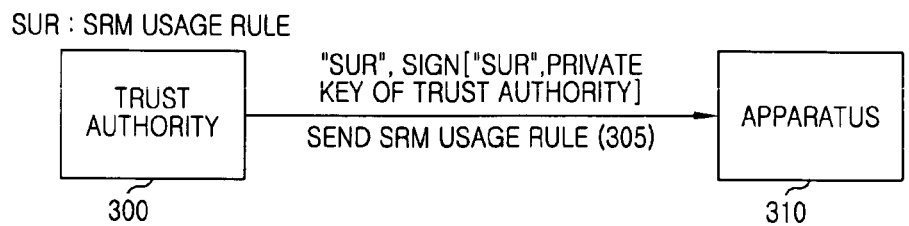
FIG. 3 illustrates a diagram of an SRM usage rule message sent from the trust authority to the apparatus.

In FIG. 2, when the service providers or the content providers 220-1 through 220-n each send an SRM usage rule message to the trust authority 200, the trust authority 200 aggregates the SRM usage rule messages received from the service providers or the content providers 220-1 through 220-n and transmits an SRM usage rule message of FIG. 3 to the apparatus 210.

Referring to FIG. 3, the trust authority 300 receiving the SRM usage rule messages from the service providers or the content providers, generates an electronic signature using its private key for the SRM usage rule. Next, the trust authority 300 sends the SRM usage rule and the electronic signature for the SRM usage rule to the apparatus 310 in step 305. Since the apparatus 310 only has to know that the source of the SRM usage rule is the reliable trust authority, the security can be maintained merely with the electronic signature using the private key of the trust authority.

Figure 4:
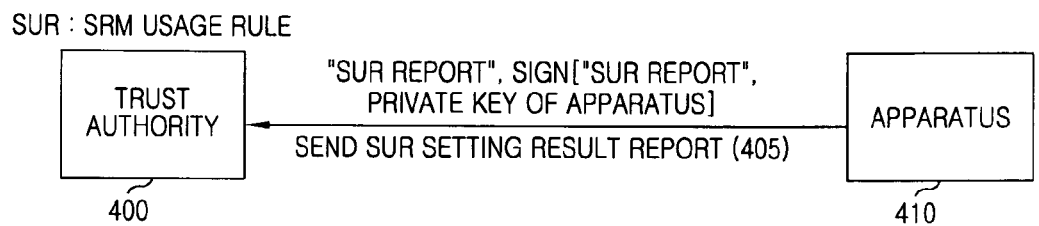
FIG. 4 illustrates a diagram of a message reporting an apparatus operation change result to the trust authority according to the SRM usage rule.

FIG. 4 depicts a message reporting the apparatus operation change result to the trust authority according to the SRM usage rule.

After completing the apparatus operation setting change according to the SRM usage rule, the apparatus 410 generates a report of the corresponding result and sends the report to the trust authority 400 in step 405. Similar to the SRM usage rule, the report can be described with an XML or a structured language of the binary type. As part of sending the report to the trust authority 400, the apparatus 410 generates the electronic signature for the report using its private key and sends the report together with the electronic signature. The trust authority 400 receiving the report can determine that the report is transmitted from the legitimate apparatus by verifying the electronic signature.

Figure 5:
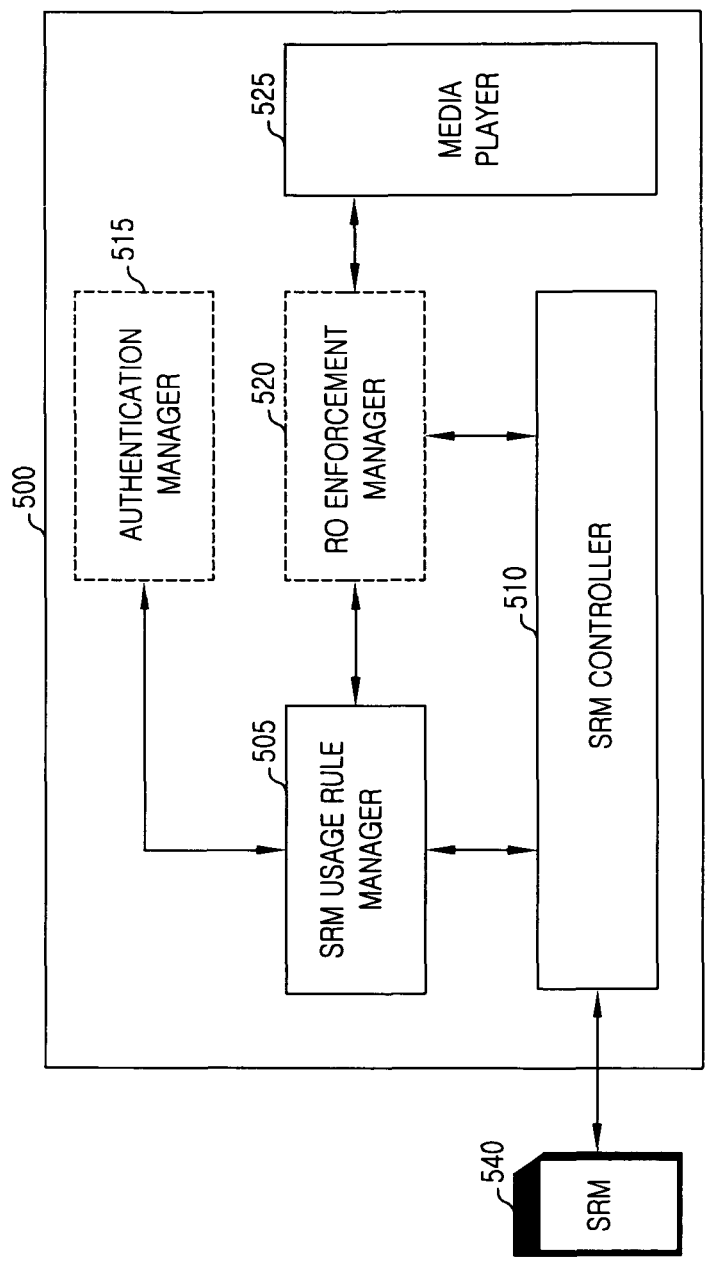
FIG. 5 illustrates a block diagram of an apparatus for changing the operation setting according to the SRM usage rule according to an exemplary embodiment of the present invention.

FIG. 5 is a block diagram of an apparatus for changing the operation setting according to the SRM usage rule according to an exemplary embodiment of the present invention.

The apparatus 500 of FIG. 5 includes an SRM usage rule manager 505, an SRM controller 510, an RO enforcement manager 520, an authentication manager 515, and a media player 525.

The SRM usage rule manager 505 checks whether the SRM usage rule message is received from a legitimate trust authority by verifying the electronic signature of the SRM usage rule received from the trust authorities 200, 300 and 400, and parses the SRM usage rule. In more detail, the SRM usage manager 505 verifies the SRM usage rule message and then analyzes its content. Based on the result of the parsing, the SRM usage rule manager 505 provides data to the SRM controller 510, the RO enforcement manager 520, and the authentication manager 515.

For instance, the SRM usage rule manager 505 provides the apparatus operation setting change data relating to the RI signature verification to the RO enforcement manager 520. The SRM usage rule manager 505 provides the apparatus operation setting change data relating to the revocation status checking using an OCSP to the authentication manger 515. The SRM usage rule manager 505 provides the apparatus operation setting change data relating to the rights move recovery and the apparatus operation setting change data relating to the event counting to the SRM controller 510. The SRM usage rule manager 505 provides the apparatus operation setting change data relating to the rights consumption and release to the RO enforcement manager 520. Next, the SRM usage rule manager 505 generates the report by aggregating the apparatus operation change results from the modules, and provides the report to the trust authorities 200, 300 and 400 if necessary. In so doing, the electronic signature is generated with the private key of the apparatus and provided together with the report.

The SRM controller 510 controls the communication between the apparatus 500 and the SRM 540 (e.g., the external memory) according to the specification of the OMA SRM standard. Also, the SRM controller 510 performs the event counting of the movement or the usage of the RO, or the recovery function with respect to the problem occurring in the RO movement.

After the apparatus operation setting change is completed according to the SRM usage rule, the SRM controller 510 generates a report of the operation setting change result. Similar to the SRM usage rule, the report can be described with an XML or a structured language of the binary type. As a part of sending the report to the trust authority, the SRM controller 510 generates the electronic signature for the report using its private key and sends the report together with the electronic signature. The trust authority, upon receiving the report, can acquire that the report is transmitted from the legitimate apparatus by verifying the electronic signature.

The authentication manager 515 performs the mutual authentication between the apparatus and the SRM, and generates the key for the secured communication. Also, the authentication manager 515 manages the key revocation information. The authentication manager 515 can use an OCSP function.

The RO enforcement manager 520 safely plays the contents using the RO according to the OMA DRM 2.0 standard. When using the RO obtained from the SRM 540, the RO enforcement manager 520 determines the release time of the RO.

The media player 525 reads the content from a storage medium, plays and displays the content to the user.

Figure 6:
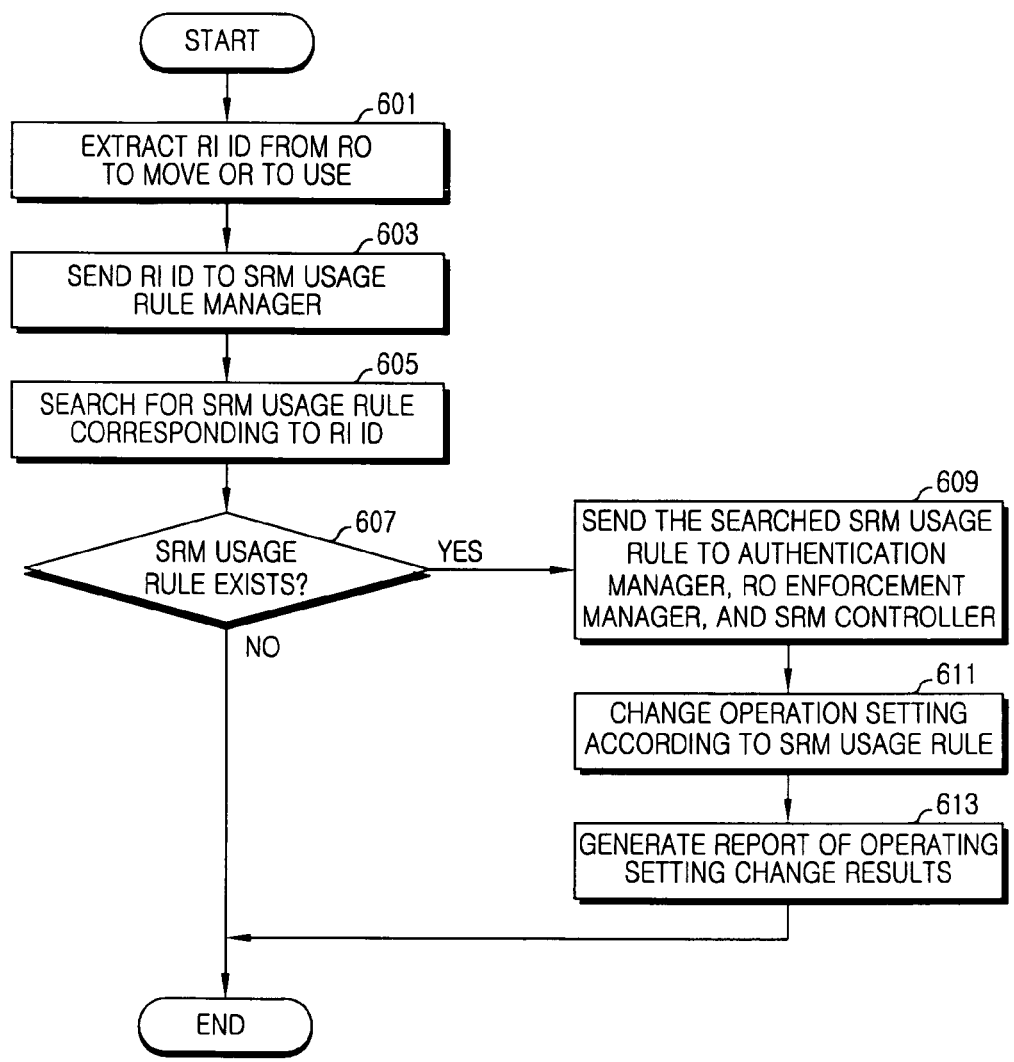
FIG. 6 illustrates a flowchart of operations of the apparatus for changing the operation setting according to the SRM usage rule according to an exemplary embodiment of the present invention.

FIG. 6 illustrates a flowchart outlining the operations of the apparatus for changing the operation setting according to the SRM usage rule according to an exemplary embodiment of the present invention.

In step 601, the apparatus extracts the RI IDentifier (ID) from the corresponding RO to move or to use.

In step 603, the apparatus sends the RI ID to the SRM usage rule manager 505.

In step 605, the apparatus searches for an SRM usage rule corresponding to the RI ID.

In step 607, the apparatus checks whether an SRM usage rule exists. If there is no SRM usage rule, the apparatus finishes this process. Upon detecting an SRM usage rule, the apparatus sends the searched SRM usage rule to the SRM controller 510, the RO enforcement manager 520, and the authentication manager 515 to analyze the SRM usage rule.

For example, the apparatus analyzes the apparatus operation setting change data relating to the RI signature verification, the apparatus operation setting change data relating to the revocation status checking using an OCSP, the apparatus operation setting change data relating to the rights move recovery, the apparatus operation setting change data relating to the event counting, and the apparatus operation setting change data relating to the rights consumption and release.

In step 611, the apparatus changes the operation setting according to the SRM usage rule.

In step 613, the apparatus generates the report of the operation setting change results.

Next, the apparatus finishes this process.

As set forth above, by flexibly changing the operation setting of the apparatus connected to the SRM in accordance with the requirements of the content service provider, various content business models can be realized.

Exemplary embodiments of the present invention can also comprise computer readable codes on a computer readable medium. The computer readable medium can comprise any data storage device that can store data that can be read by a computer system. Examples of a computer readable medium include magnetic storage media (such as, ROM, floppy disks, hard disks, among others), optical recording media (such as, CD-ROMs, or DVDs), and storage mechanisms such as carrier waves (such as, transmission through the Internet). The computer readable medium can also be distributed over network coupled computer systems so that the computer readable code is stored and executed in a distributed fashion. Also, functional programs, codes, and code segments for accomplishing exemplary embodiments of the present invention can be construed by programmers of ordinary skill in the art to which the present invention pertains.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for using a Secure Removable Media (SRM) in Digital Rights Management (DRM), the apparatus comprising:
   a receiving module configured to receive a message comprising one or more SRM usage rules of one or more content service providers including at least one of Rights Issuer Signature Verification, Revocation Status Checking using Online Certificate Status Protocol (OCSP), Rights Move Recovery, Rights Consumption and Release and Event Counting, from a trust authority that gathers the one or more SRM usage rules of the one or more content service providers;
   an SRM usage rule manager configured to verify an electronic signature of the message comprising the one or more SRM usage rules; and
   a processor configured to analyze and process the verified SRM usage rules of the one or more SRM usage rules and change an apparatus operation according to a signature verification for corresponding content playing.

2. The apparatus of claim 1, wherein the processor is configured to change an apparatus operation according to an updating of a Certification Revocation List (CRL) based on an Online Certificate Status Protocol (OCSP).

3. The apparatus of claim 1, wherein the processor is configured to change an apparatus operation according to rights move recovery when a Rights Object (RO) is copied or when the Rights Object is strictly restricted and erased.

4. The apparatus of claim 1, wherein the processor is configured to change an apparatus operation according to rights consumption and release which determines a time to release a Rights Object.

5. The apparatus of claim 1, wherein the processor is configured to change an apparatus operation according to whether an event counting scheme is adopted or not.

6. The apparatus of claim 1, wherein, when an apparatus operation setting change according to the one or more SRM usage rules is completed, the SRM usage rule manager is configured to generate a report of the result.

7. The apparatus of claim 6, wherein the report is transmitted to the trust authority together with the electronic signature using a private key of the apparatus.

8. The apparatus of claim 1, wherein the SRM usage rule manager comprises:
   an interface module configured to connect with the Secure Removable Media.

9. The apparatus of claim 1, wherein the message for the one or more SRM usage rules is received together with an electronic signature of the trust authority.

10. The apparatus of claim 1, wherein the apparatus comprises at least one of a portable terminal, a computer, a Personal Digital Assistants (PDA), a MP3 player, a Portable Multimedia Player (PMP), and a PlayStation Portable (PSP).

11. A method for using a Secure Removable Media (SRM) in Digital Rights Management (DRM), the method comprising:
   receiving a message comprising one or more SRM usage rules of one or more content service providers including at least one of Rights Issuer Signature Verification, Revocation Status Checking using Online Certificate Status Protocol (OCSP), Rights Move Recovery, Rights Consumption and Release and Event Counting, from a trust authority that gathers the one or more SRM usage rules of the one or more content service providers;

verifying an electronic signature of the message comprising the one or more SRM usage rules; and analyzing and processing the verified SRM usage rules of the one or more SRM usage rules and changing an apparatus operation according to a signature verification for corresponding content playing.

12. The method of claim 11, wherein the analyzing and processing of the verified SRM usage rules changes an apparatus operation according to an updating of a Certification Revocation List (CRL) based on an Online Certificate Status Protocol (OCSP).

13. The method of claim 11, wherein the analyzing and processing of the verified SRM usage rules changes an apparatus operation according to rights move recovery when a Rights Object (RO) is copied or when the Rights Object is strictly restricted and erased.

14. The method of claim 11, wherein the analyzing and processing of the verified SRM usage rules changes an apparatus operation according to rights consumption and release which determines a time to release a Rights Object.

15. The method of claim 11, wherein the analyzing and processing of the verified SRM usage rules changes an apparatus operation according to whether an event counting scheme is adopted or not.

16. The method of claim 11, wherein, when the apparatus operation setting change according to the SRM usage rules is completed, the analyzing and processing of the verified SRM usage rules generates a report of the result.

17. The method of claim 16, wherein the report is transmitted to the trust authority together with the electronic signature using a private key of an apparatus.

18. The method of claim 11, further comprising:
interfacing to connect with the Secure Removable Media.

19. The method of claim 11, wherein the message for the SRM usage rules is received together with an electronic signature of the trust authority.

20. The method of claim 11, wherein the method is implemented using at least one of a portable terminal, a computer, a Personal Digital Assistants (PDA), a MP3 player, a Portable Multimedia Player (PMP), and a PlayStation Portable (PSP).

21. A method for using a Secure Removable Media (SRM) in Digital Rights Management (DRM), the method comprising:

determining, by a plurality of content service providers, one or more SRM usage rules including at least one of Rights Issuer Signature Verification, Revocation Status Checking using Online Certificate Status Protocol (OCSP), Rights Move Recovery, Rights Consumption and Release and Event Counting, and providing the determination to a trust authority, which issues and manages a key, using an eXtensible Markup Language (XML);

receiving messages comprising the one or more SRM usage rules of the plurality of content service providers from the plurality of content service providers and sending the messages to an apparatus together with an electronic signature; and receiving the messages comprising the one or more SRM usage rules and changing an operation of the apparatus according to requirements of at least one content service provider and according to a signature verification for corresponding content playing.

22. The method of claim 21, wherein the one or more SRM usage rules comprise data relating to at least one of whether a signature verification is on or off, whether an Online Certificate Status Protocol (OCSP) is used or not, whether a copy according to movement of a Rights Object (RO) is permitted or not, whether an RO release time is used or not, and whether an event counting is used or not.

23. The method of claim 21, further comprising:
reporting of the apparatus operation changed by each of the one or more SRM usage rules using a private key of the apparatus.

24. A system for using a Secure Removable Media (SRM) in Digital Rights Management (DRM), the system comprising:

content service providers configured to determine one or more SRM usage rules including at least one of Rights Issuer Signature Verification, Revocation Status Checking using Online Certificate Status Protocol (OCSP), Rights Move Recovery, Rights Consumption and Release and Event Counting, and providing the deteunination to a trust authority, which issues and manages a key, using an eXtensible Markup Language (XML); and the trust authority configured to receive one or more messages comprising the one or more SRM usage rules of the content service providers from the content service providers and send the messages to an apparatus together with an electronic signature wherein at least one of the one or more messages is configured to cause the apparatus to change an operation of the apparatus according to requirements of at least one content service provider and according to a signature verification for corresponding content playing.

25. The system of claim 24, wherein the one or more SRM usage rules comprise data relating to at least one of whether a signature verification is on or off, whether an Online Certificate Status Protocol (OCSP) is used or not, whether a copy according to movement of a Rights Object (RO) is permitted or not, whether an RO release time is used or not, and whether an event counting is used or not.

26. The system of claim 24, further comprising:
a SRM usage rule manager configured to generate a report of the apparatus operation changed by the one or more SRM usage rules using a private key of the apparatus.

27. A non-transitory computer-readable recording medium having recorded thereon a program for using a Secure Removable Media (SRM) in Digital Rights Management (DRM), the program comprising:

a first code segment, for receiving a message comprising one or more SRM usage rules of content service providers including at least one of Rights Issuer Signature Verification, Revocation Status Checking using Online Certificate Status Protocol (OCSP), Rights Move Recovery, Rights Consumption and Release and Event Counting, from a trust authority that gathers the one or more SRM usage rules of the content service providers;

a second code segment, for verifying an electronic signature of the message comprising the one or more SRM usage rules; and a third code segment, for analyzing and processing the verified SRM usage rules of the one or more SRM usage rules and changing an apparatus operation according to a signature verification for corresponding content playing.

* * * * *